US010274993B2

(12) United States Patent
Teator

(10) Patent No.: US 10,274,993 B2
(45) Date of Patent: Apr. 30, 2019

(54) PORTABLE DEVICE DOCKING STATION FOR PRIVACY PROTECTION

(71) Applicant: Nathaniel Teator, Cohoes, NY (US)

(72) Inventor: Nathaniel Teator, Cohoes, NY (US)

(73) Assignee: Nathaniel Teator, Cohoes, NY (US)

(*) Notice: Subject to any disclaimer, the term of this patent is extended or adjusted under 35 U.S.C. 154(b) by 0 days.

(21) Appl. No.: 15/885,259

(22) Filed: Jan. 31, 2018

(65) Prior Publication Data

US 2018/0314297 A1 Nov. 1, 2018

Related U.S. Application Data

(60) Provisional application No. 62/492,251, filed on Apr. 30, 2017.

(51) Int. Cl.
*G06F 1/16* (2006.01)
*G03B 11/00* (2006.01)

(52) U.S. Cl.
CPC ............ *G06F 1/1632* (2013.01); *G03B 11/00* (2013.01); *G06F 1/1679* (2013.01)

(58) Field of Classification Search
None
See application file for complete search history.

(56) References Cited

U.S. PATENT DOCUMENTS

| 8,724,020 B1* | 5/2014 | Haddad | H04N 5/2254 |
| | | | 348/375 |
| 8,837,131 B1* | 9/2014 | Colby | G06F 1/1667 |
| | | | 361/679.06 |
| 8,955,678 B2* | 2/2015 | Murphy | B23P 19/00 |
| | | | 206/320 |
| 9,411,379 B2* | 8/2016 | Rinner | G06F 1/1656 |
| 9,501,096 B2* | 11/2016 | Sharma | G06F 1/1632 |
| 9,847,806 B1* | 12/2017 | Dickie | H04B 1/3888 |
| 2012/0262854 A1* | 10/2012 | Robert | G06F 1/1613 |
| | | | 361/679.01 |
| 2013/0277520 A1* | 10/2013 | Funk | F16M 13/02 |
| | | | 248/274.1 |
| 2014/0119718 A1* | 5/2014 | Oh | G03B 11/041 |
| | | | 396/448 |
| 2015/0241931 A1* | 8/2015 | Carnevali | G06F 1/181 |
| | | | 361/679.41 |
| 2015/0311941 A1* | 10/2015 | Sorrentino | H04M 1/185 |
| | | | 455/575.8 |
| 2016/0049979 A1* | 2/2016 | Grouwstra | H04B 1/3888 |
| | | | 455/575.8 |

* cited by examiner

*Primary Examiner* — Dimary S Lopez Cruz
(74) *Attorney, Agent, or Firm* — Carlos Perez

(57) ABSTRACT

Disclosed herein are embodiments of docking frames for protecting the privacy of portable electronic device users against cyberintrusions. An embodiment of the docking frame has a first sidewall for receiving a first side of the device and a second sidewall for receiving a second side of the device. A protrusion extends from at least one of the sidewalls, enough to cover a front-facing camera in the front of the portable electronic device. A sound-reducing material is attached to at least one of the sidewalls to make contact with the electronic device's microphone, so as to muffle sound entering a microphone.

11 Claims, 4 Drawing Sheets

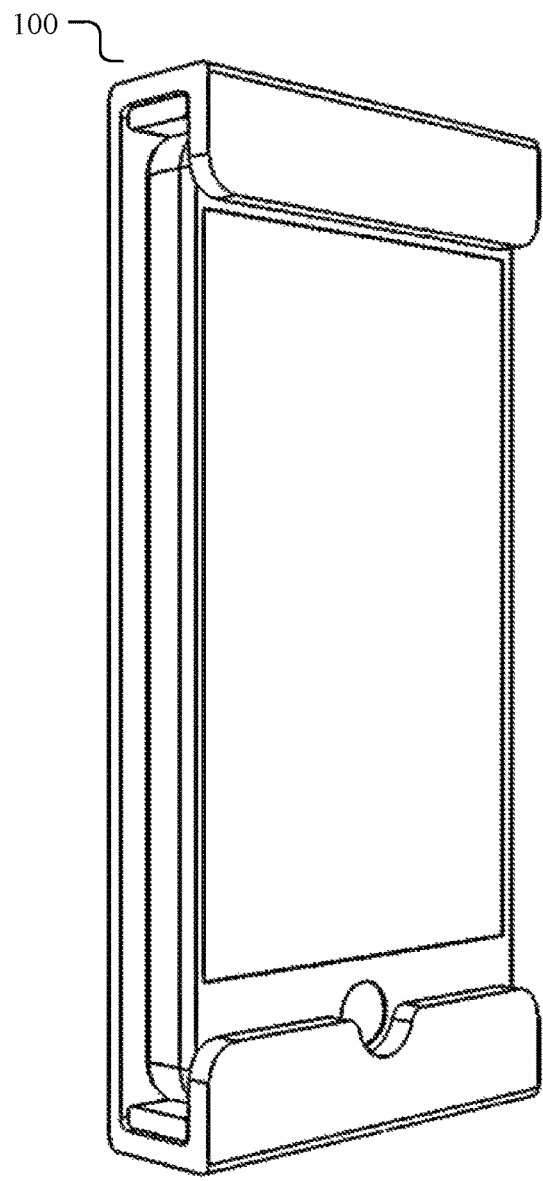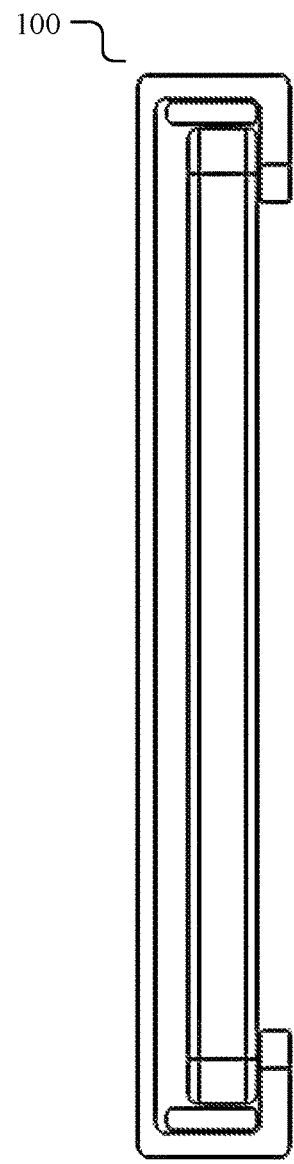
FIG. 4A                    FIG. 4B

PORTABLE DEVICE DOCKING STATION FOR PRIVACY PROTECTION

BACKGROUND

Technical Field

Embodiments generally relate to docking frames and mounts for portable electronic devices.

Background

For the past several years, many portable electronic devices have been designed with integrated cameras, microphones and network capabilities as standard features. As consumers periodically acquire new devices, they sometimes accumulate a collection of old devices, such as smartphones, tablets, etc. Instead of discarding them, some users prefer to repurpose these ubiquitous devices for other tasks, such as serving as a music player, alarm clock, webcam, digital photo frame, informational display, etc. However, concerns exist regarding the capabilities of these devices to record and transmit private information to cyberintruders that have found ways to compromise them. Even when not in use, these devices may pose a security risk due to their integrated sensors and wireless connectivity. These security risks may prevent users from permanently mounting devices in spaces where privacy is expected.

SUMMARY

Disclosed herein are embodiments of docking frames for protecting the privacy of portable electronic device users against cyberintrusions. An embodiment of the docking frame has a first sidewall for receiving a first side of the device and a second sidewall for receiving a second side of the device. A protrusion extends from at least one of the sidewalls, enough to cover a front-facing camera in the front of the portable electronic device. A sound-reducing material is attached to at least one of the sidewalls to make contact with the electronic device's microphone, so as to muffle sound entering a microphone. When multiple microphones are present on a device (such as for noise cancelation or stereo sound) the multiple microphones may be covered by the frame's side walls, for user privacy. These privacy-enhancing embodiments may change how a user is able to interact with a device, allowing it to be openly exhibited in spaces where privacy is expected.

The embodiments disclosed above are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The accompanying drawings are incorporated herein and form a part of the specification.

FIG. 4A is a perspective view showing the front of a docking frame with a docked electronic device, according to an example embodiment.

FIG. 4B is a side view showing the side of a docking frame with a docked electronic device, according to an example embodiment.

DETAILED DESCRIPTION

Provided herein are embodiments of docking frames for protecting the privacy of electronic device users against cyberintrusions. The docking frame may serve as a convenient means of accommodating a portable electronic touch screen device, such as a smartphone, tablet computer, etc. while covering the device's camera lenses and microphones. In this manner, the frame ensures a user's privacy if the device is compromised by cyberintruders that gain control of the device's camera or microphone. For example, an unauthorized person could gain access to the electronic device's camera and networking capabilities, and thus command the electronic device to take photos or videos and transmit them over a network. Embodiments block the camera so the device would be prevented from taking useful photographs. In an example, an unauthorized person could gain access to the electronic device's microphone and networking capabilities, and thus command the device to record audio and transmit it over a network. Embodiments block the device's microphone with sound-reducing material so the device would be prevented from taking useful audio. The frame may be used in any suitable manner to maintain the device in a fixed position, for example, as a wall frame mounted to a wall, a table frame keeping the device upright on a surface, etc.

Figure 1:
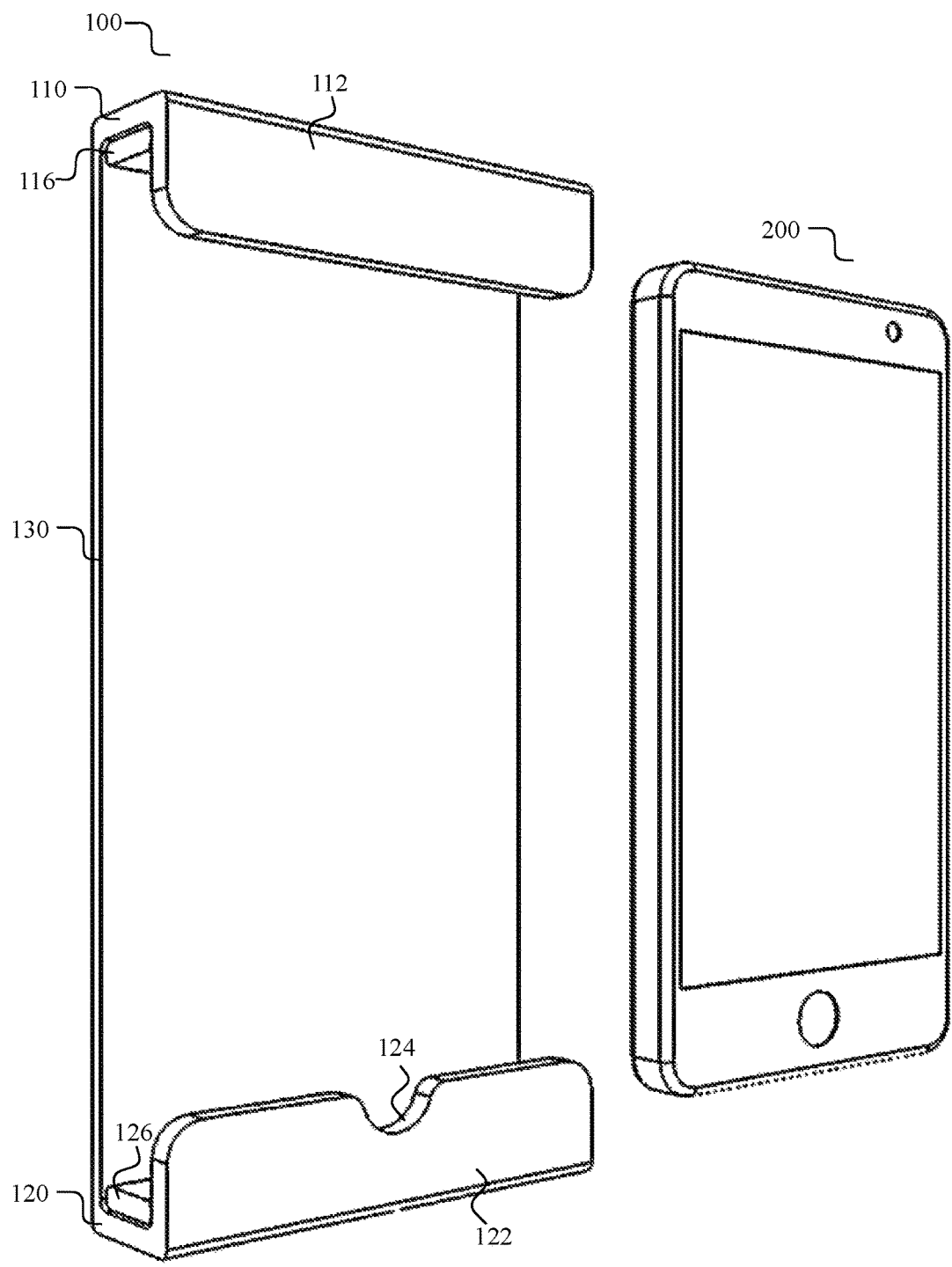
FIG. 1 is a perspective view showing the front of a docking frame, according to an example embodiment.
Figure 3:
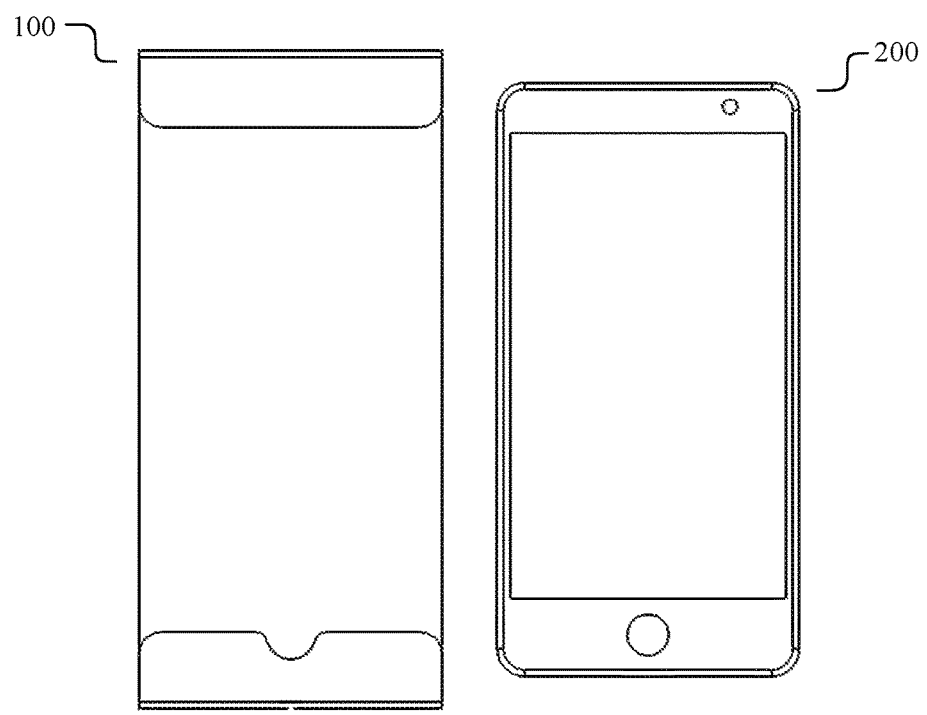
FIG. 3 is a front view showing the front of a docking frame with and without a docked electronic device, according to an example embodiment.
Figure 3:
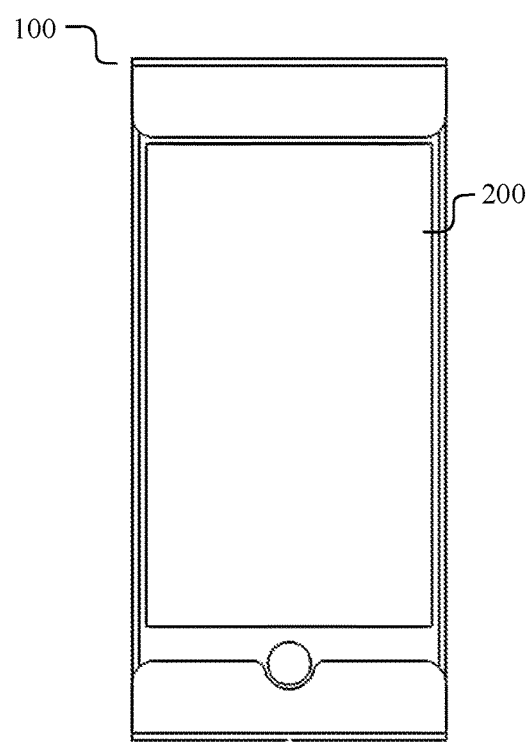

FIG. 1 is a perspective view of a docking frame 100, according to an example embodiment. Frame 100 may serve as a mount or docking station for correspondingly shaped electronic device 200. Frame 100 may comprise a sidewall 110 and another sidewall 120. Sidewalls 110 and 120 may be spaced so as to snugly fit a rectangular electronic device 200, such as a smartphone, tablet computer, etc. as illustrated in FIGS. 3, 4A, and 4B. A back wall 130 may connect sidewalls 110 and 120. In particular embodiments, back wall 130 may be a continuous surface, as shown in FIG. 1. In particular embodiments, back wall 130 may be an adjustable panel that can increase or decrease the distance between sidewalls 110 and 120, so as to snugly accommodate devices of various sizes.

Electronic device 200 may be any portable electronic device or machine that includes a screen and input sensors such as a camera or a microphone. As an example, electronic device 200 may include a touchscreen user interface, wireless data connectivity, software applications, and data storage. By way of example, electronic device 200 may be a smartphone, a tablet computer, an LCD monitor, laptop computer, etc.

Frame 100 can be made in any shape and comprise any material suitable for holding the weight of a corresponding electronic device. For example, frame 100 may comprise a single piece of material made out of a mold, or various manufactured adjustable pieces attached together. In particular embodiments, frame 100 is made of a rigid solid material, such as, by way of example, plastic, metal, wood, glass, carton, cardboard, etc. In particular embodiments, frame 100 is made of a flexible material, such as, by way of example, flexible plastic, rubber, fabric, etc.

Frame 100 may further include a protrusion 112 extending from sidewall 110. In particular embodiments, protrusion 112 comprises a solid material that is opaque or impenetrable to light, e.g., plastic, metal, wood, opaque glass, etc. Protrusion 112 may extend enough distance to completely cover a camera lens of an electronic device 200. While protrusion 112 is shown in FIG. 1 as extending across the width of frame 100, it should be understood that any suitable protrusion is contemplated by this disclosure. For example, protrusion 112 may only extend for short portion of the width so as to cover the camera lens, while allowing exposure to the electronic device's interactive touch screen.

In particular embodiments, frame 100 may further include a second protrusion 122 extending from sidewall 120. Protrusions 112 and 122 may further include shapes or indentations that allow access to certain portion of the electronic device's interface. As an example, protrusion 122 may include an indentation 124 to accessing a button on the front of electronic device 200.

Sidewalls 110 and 120 may further include sound-reducing material for blocking sound from a microphone integrated into an electronic device 200. As an example, electronic device 200 may include a microphone hole at one side of the device. Sidewall 120 may include a sound-reducing material 126 configured to make contact with the electronic device when the device is positioned within frame 100. In this manner, the microphone holes are in firm contact with, and are snugly covered by the sound-reducing material 126. Analogously, sidewall 110 may include a sound-reducing material 116 for electronic devices that have a microphone at another side of the device.

Sound-reducing material 116 or 126 may be any suitable sound-proofing, sound-absorbing or sound-blocking material, such as, by way of example, acoustical foam, acoustical panels, acoustical cotton material, etc.

Figure 2:
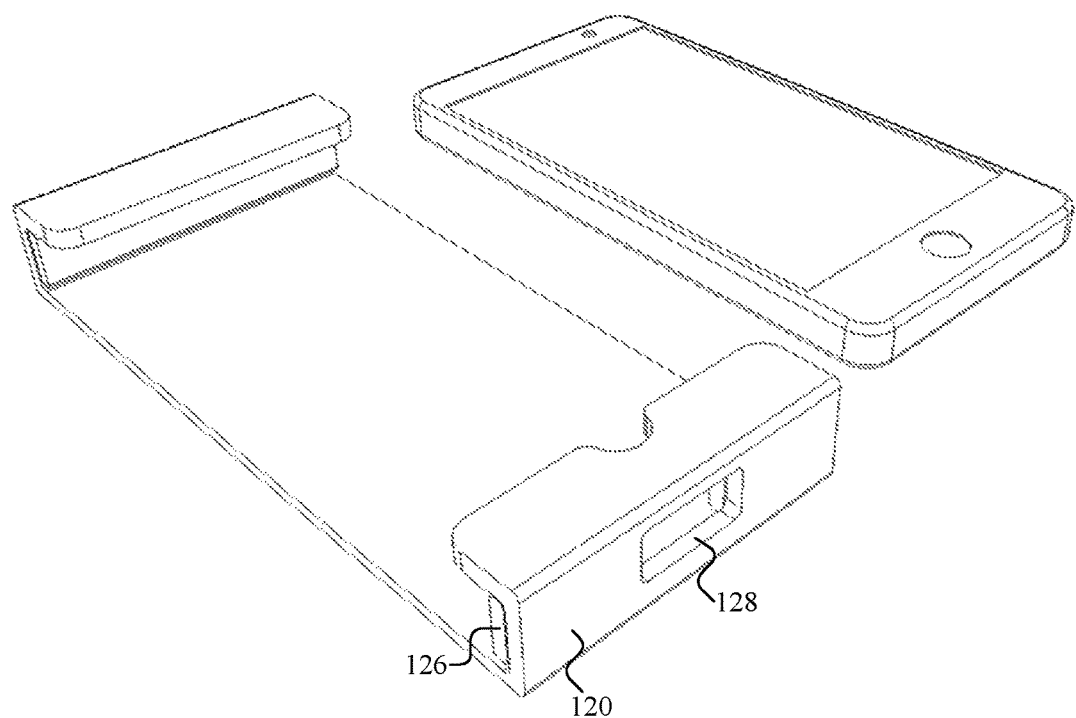
FIG. 2 is a perspective view showing the bottom of a docking frame, according to an example embodiment.

FIG. 2 is a perspective view showing the bottom of a docking frame, according to an example embodiment. As the bottom view of the docking frame shows, frame 100 may include a an opening 128 for accessing sockets, buttons, or other elements of an electronic device 200. As an example, an electronic device may include a power socket or a headphone socket, and opening 128 may allow access to the socket. In this manner, if frame 100 is hung on a wall, a user may be able to conveniently connect a charger to power the device or speakers to play music from the device. Although not shown in the figures, it should be understood that additional openings may be included on sidewalls 110 and 120 for access to any elements on the front of the electronic device, such as functional buttons, device output services, etc.

Frame 100 may further include any suitable means for positioning or setting the frame according to any desirable use of the electronic device. As an example, frame 100 may include parts in the back for conveniently hanging the phone on a wall, such as, by way of example, wires, hooks, fastener notches, adhesive, etc. In particular embodiments, frame 100 may include suitable means of positioning the device on a surface. As an example, frame 100 may be a phone stand allowing a smartphone to be positioned upright in portrait (vertically) and/or landscape (sideways or horizontally) mode on a surface. As another example, frame 100 may further include a permanent or adjustable angle kickstand for positioning upright in portrait and/or landscape mode on a surface.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A docking frame for a portable electronic touchscreen device, the frame comprising:
   a first sidewall for receiving a first end of the device;
   a second sidewall for receiving a second end of the device;
   a back wall connecting the first and second sidewalls, wherein at least a third side of the frame to the first and second sidewalls has an opening, the opening being sized to snugly fit the portable electronic touchscreen device;

a non-removable protrusion extending from at least one of the first or second sidewall, wherein the protrusion extends enough to cover a camera on a front portion of the device, wherein the first sidewall, the second sidewall, the backwall and the protrusion are comprised of a single piece of material; and a sound-reducing material attached to at least one of the first or second sidewall, the material operable to make contact with a microphone on the device, wherein the frame is mountable to a wall.

2. The docking frame of claim 1, wherein the electronic device comprises one of a smartphone or a tablet computer.

3. The docking frame of claim 2, wherein sound-reducing material is attached to both the first and second sidewall.

4. The docking frame of claim 1, wherein the protrusion extends from the first sidewall, the frame further comprising:

a second protrusion extending from the second sidewall, wherein the second protrusion extends enough to cover a second front portion of the device.

5. The docking frame of claim 4, wherein at least one of the first or second protrusion comprises an indentation for allowing access to an interface button of the electronic device.

6. The docking frame of claim 1, wherein at least one of the first or second sidewall comprises an opening for allowing access to a socket of the electronic device.

7. The docking frame of claim 6, wherein the socket comprises a power socket for charging the electronic device.

8. The docking frame of claim 1, wherein the frame is mountable to a wall using at least one of a wire, hook, fastener notch, or adhesive.

9. The docking frame of claim 1, wherein the frame is made of a flexible plastic material.

10. The docking frame of claim 1, wherein the frame is made of a solid material.

11. The docking frame of claim 10, wherein the solid materials comprises at least one of wood, plastic, or metal.

* * * * *